United States Patent Office

3,439,101
Patented Apr. 15, 1969

3,439,101
BICYCLO[3.2.1]OCTANE AMINES AS
ANTI-INFLUENZA AGENTS
Alfred W. Chow, Radnor, Pa., assignor to Smith Kline &
French Laboratories, Philadelphia, Pa., a corporation
of Pennsylvania
No Drawing. Filed Aug. 9, 1966, Ser. No. 571,189
Int. Cl. A61k 27/00; C07c 87/40
U.S. Cl. 424—325                                          8 Claims

ABSTRACT OF THE DISCLOSURE

Bicyclo[3.2.1]octanes, substituted with an amino, aminomethyl, or α-aminoethyl group, are prepared, formulated, and administered to warm-blooded mammals to combat influenza infections.

---

The present invention relates to amino derivatives of bicyclo[3.2.1]octane and to methods of using said compounds to ameliorate the effects of and prevent influenza infections.

The compounds of the present invention are characterized by the following structural formulas:

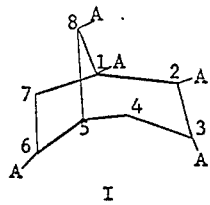 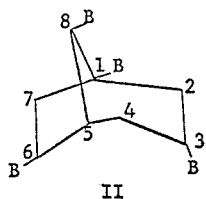

where one A group is

and the other A groups are hydrogen, and one B group is $CH_2NH_2$ and the other B groups are hydrogen.

The invention also includes a method of ameliorating the effects of and preventing influenza infections comprising administering to an infected warm-blooded mammal or to such a mammal prior to infection an effective, but nontoxic, amount of a compound of the Formula III or a pharmaceutically acceptable acid addition salt thereof.

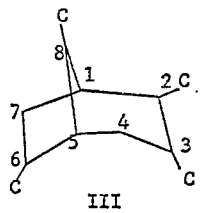

where one C group is $NH_2$, $CH_2NH_2$, or

and the other C groups are hydrogen.

The compounds of Formula I are prepared as follows: The 1-(α-aminoethyl) compound is prepared by treating the 1-carboxylic acid with methyl lithium to give the methyl ketone, converting the ketone to the oxime, and reducing the oxime with lithium aluminum hydride or by catalytic means. The 2-(α-aminoethyl) compound is prepared by treating the known 2-carboxylic acid in the same manner. The 3, 6, and 9-(α-aminoethyl) compounds are prepared by treating the appropriate ketone with methoxymethylene triphenylphosphorane, generated from methoxymethyl triphenylphosphonium chloride and butyl lithium in solvents such as tetrahydrofuran and diglyme. The resulting methoxymethylene compound is then converted to the carboxaldehyde by means of a strong acid such as perchloric or hydrochloric acid, and the aldehyde oxidized to the carboxylic acid with silver nitrate. The acids are then converted to the α-aminoethyl products by methods described above.

The various aminomethyl compounds of Formula II are prepared by converting the appropriate carboxylic acid to an acid chloride, converting the acid chloride to the amide with aqueous or gaseous ammonia, and reducing the amide with lithium aluminum hydride.

The other compounds which are part of the method or process aspect of the invention are prepared as follows:

The 2-amino compound is obtained as described in German Patent 1,167,337.

The 3, 6, and 8-amino compounds are prepared by converting the known ketones to their oximes, and then reducing the oximes to the amines catalytically or with lithium aluminum hydride.

The amine compounds of the invention are readily converted to acid addition salts by conventional methods, including addition of the acid in pure form or as an ethereal, alcoholic, or acetone solution to the free base, which may also be in solution. The salts of these bases with pharmaceutically acceptable acids, being merely more convenient, more soluble, or more stable forms of the physiologically active bases, are the full epuivalents of said bases. Exemplary of the pharmaceutically acceptable acids are hydrochloric, hydrobromic, sulfuric, maleic, succinic, and tartaric acids.

The compounds of the invention are active at dose levels of 6.25–100 mg./kg. They are used and the methods of the invention are practiced by formulating the compounds into pharmaceutical compositions in the conventional manner and administering them to a warm-blooded mammal infected with or susceptible to influenza viruses, particularly type $A_2$. The 2-amino compound has been found to cause a 40–95% increase in the survival of mice infected with Asian influenza at subcutaneous doses of 6.25–100 mg./kg. The 3-amino compound causes a 30–50% increase at 100 mg./kg, and the 8-amino compound causes a 45–55% increase at 25 mg./kg. The preferred compositions are tablets and capsules to be administered orally and suspensions and solutions to be administered intranasally. These compositions may include such standard excipients as lactose, starch, terra alba, magnesium stearate, calcium sulfate, glycerol mono or distearate, gelatin, or wax. The oral compositions may contain 50–500 mg. of intiviral compound or salt thereof, and may be administered either as one dose or in divided doses. The intranasal preparation may be a 2–10% solution or suspension and may be a spray or nose drops.

It will be apparent to one skilled in the art of medicinal chemistry that certain obvious variants in the compounds and methods of the present invention may be introduced without departing from the spirit thereof. Such variants include lower alkyl and acyl derivatives of the amines, as well as amine oxides and quaternary salts. Such variants are prepared by standard alkylation, acylation, oxidation, and quaternization reactions and so far as they possess the same properties are the full equivalents of the claimed compounds.

EXAMPLE 1

Bicyclo[3.2.1]octan-2-amine

To 80 g. of $H_2SO_4$ is added dropwise at 10–15° 14 ml. of $CH_3CN$, followed by 31.0 g. (0.245 mole) of bicyclo-[2.2.1]heptane-2-methanol [Ber. 71, 1939 (1938)]. The mixture is stirred for 2½ hours at 20° and neutralized with 10% NaOH (554 ml.), and the 2-acetamidobicyclo[3.2.1]-octane intermediate extracted with benzene. The amide is crystallized from n-hexane to give M.P. of 133–134°.

The amide (1 g., 0.0055 mole) is refluxed in conc. HCl under $N_2$ for 20 hours, and the solid obtained is recrystallized from $CH_3CN$ to give the hydrochloride salt of the title product, M.P. 310°. The free base is obtained by dissolving the salt in water, making the solution basic, and extracting with ether.

This procedure is similar to that described in German Patent 1,167,337.

EXAMPLE 2

Bicyclo[3.2.1]octan-3-amine

To a solution of 16.3 g. (0.234 mole) of $NH_2OH \cdot HCl$ in 65 ml. of water is added 65 ml. of 10% NaOH and the pH is adjusted to 6.6. To this solution is added 6.5 g. (0.052 mole) of bicyclo[3.2.1]octan-3-one [J. Org. Chem. 28, 2200 (1963)] dissolved in 13 ml. of alcohol. The mixture is heated at 70° for 45 minutes and then cooled, and the white oxime precipitates.

This oxime (1 g., 0.0064 mole) is dissolved in 200 ml. of methanol containing some ethereal CHl and 0.3 g. of $PtO_2$ and hydrogenated at 60° and 60 p.s.i. for 10 hours. Following evaporation, the hydrochloride salt of the title amine is recrystallized from methanol-ether to give M.P. of 300° dec. The base is obtained in the usual manner.

EXAMPLE 3

Bicyclo[3.2.1]octan-6-amine

A solution of 4.0 g. (0.032 mole) of bicyclo[3.2.1]-octan-6-one [Rocz. chim. 36, 235 (1962)], 4.0 g. of $NH_2OH \cdot HCl$, and 16 g. of KOH in 80 ml. of 95% ethanol is refluxed for 2 hours. The mixture is poured into ca. 500 ml. of water and neutralized to pH 6 with concentrated HCl. The mixture is then extracted with ether and the ether extracts are dried and evaporated to give the intermediate oxime.

A mixture of 9.0 g. (0.064 mole) of the oxime and 3.6 g. of $PtO_2$ in 300 ml. of ethanol (containing 20 ml. of ethereal HCl) is hydrogenated at 60° and 60 p.s.i. for 15 hours. The catalyst is filtered off, and the filtrate evaporated in vacuo. The residue is dissolved in water, filtered, and made basic with 10% NaOH. The free amine is extracted with ether and obtained upon drying and evaporating the solvent. The amine is dissolved in ether and ethereal HCl is added to give the hydrochloride salt. Recrystallization from ethyl acetate-isopropanol gives a pure sample, decomp. at 300°.

EXAMPLE 4

Bicyclo[3.2.1]octan-8-amine

A solution of 2.5 g. (0.2 mole) of bicyclo[3.2.1]-octan-8-one [Tetrahedron 20, 687 (1964)], 1.7 g. (0.025 mole) of $NH_2OH \cdot HCl$, and 2.6 g. of pyridine in 50 ml. of alcohol is refluxed overnight. After evaporation and recrystallization from n-hexane, the intermediate 8-oxime is obtained.

This oxime (0.9 g., 0.0064 mole) is dissolved in 200 ml. of methanol containing some ethereal HCl and 0.3 g. of $PtO_2$ and hydrogenated at 60° and 60 p.s.i. for 8 hours. After evaporation, the hydrochloride of the title amine is recrystallized from methanol-ether to give pure salt, M.P. 250° dec. The free base is obtained in the usual manner.

EXAMPLE 5

α-Methylbicyclo[3.2.1]octane-1-methylamine

Bicyclo[3.2.1]octane-1-carboxylic acid (4.71 g., 0.0306 mole) is dissolved in 100 ml. of dry tetrahydrofuran and, with stirring under nitrogen, 31 ml. (0.062 mole) of 2 N methyl lithium in ether is added over 3 to 4 minutes. The mixture is refluxed overnight and cooled to room temperature. Water (25 ml.) is added, and the product extracted into ether. After drying over $MgSO_4$, the ether is removed to give bicyclo[3.2.1]oct-1-yl methyl ketone.

To a mixture of 5.5 g. of the ketone, 3.22 g., (0.0463 mole) of $NH_2OH \cdot HCl$, and 15 ml. of ethanol are added, portionwise with stirring, 3 ml. of water and 5.9 g. of powdered NaOH. The reaction mixture is stirred and refluxed for 5 minutes and then poured into an ice cold solution of 20 ml. of concentrated HCl in 110 ml. of water. The colorless solid is filtered and washed with water. By drying over $P_2O_5$, the oxime is obtained.

A mixture of 5.35 g. (0.032 mole) of the oxime and 1.8 g. of $PtO_2$ in 150 ml. of ethanol (containing 10 ml. of ethereal HCl) is hydrogenated at 60° and 60 p.s.i. for 15 hours. The catalyst is filtered off and the filtrate evaporated in vacuo. The residue is dissolved in water, filtered, and made basic with 10% NaOH. The free product amine is extracted with ether. Drying and evaporation gives the product. The amine is dissolved in ether and ethereal HCl is added to precipitate the hydrochloride salt of the amine; purification is achieved by recrystallization.

The corresponding α - methylbicyclo[3.2.1]octane - 2 - methylamine is prepared in the same manner from the 2-carboxylic acid.

EXAMPLE 6

α-Methylbicyclo[3.2.1]octane-6-methylamine

A stirred suspension of methoxymethyl triphenyl phosphonium chloride (40 g., 0.117 mole) in tetrahydrofuran (200 ml.) is treated dropwise with ethereal butyl lithium (105 ml., 0.10 mole) in a nitrogen atmosphere and allowed to stir at 25° for 3 hours. To the resulting deep red solution is added dropwise a solution of bicyclo[3.2.1]octan-6-one (6.2 g., 0.05 mole) in tetrahydrofuran (40 ml.) and diglyme (40 ml.). After stirring 4 hours at 25°, the tetrahydrofuran is removed by heating on a steam bath. Diglyme (200 ml.) is added and the mixture heated at reflux for 7 hours. The mixture is then cooled, concentrated to one-half volume in vacuo, and treated with methyl bromoacetate to remove any triphenylphosphine. After standing 12 hours, the solid is filtered off and the filtrate washed with water. Evaporation of the dry organic layer gives, after alumina column chromatography, 3-methoxymethylene bicyclo[3.2.1]octane.

This vinyl ether is allowed to stand 15 minutes at room temperature in a saturated solution of ether in $HClO_4$, poured into aqueous $NAHCO_3$ and extracted with ether. Evaporation of the dried ether layer gives the 6-carboxaldehyde.

To a solution of 2.48 g. (0.018 mole) of this aldehyde and 11.32 g. of $AgNO_3$ in a mixture of 45 ml. of water and 35 ml. of absolute ethanol is added, dropwise with stirring over a 2 hour period, a solution of 4.2 g. of NaOH in 75 ml. of water. The resulting mixture is stirred overnight, filtered, extracted with ether, acidified, and again extracted with ether. Drying and evaporation of the ether gives the 6-carboxylic acid, which is converted to the title product by procedures described in Example 5.

Bicyclo[3.2.1] octan-8-one is correspondingly converted to its carboxylic acid by the procedures described above. Bicyclo[3.2.1]octane-3-carboxylic acid is prepared by the procedure given in Annalen 692, 51 (1966). They are then converted to a α-methylbicyclo[3.2.1]octane-8-methylamine and α-methylbicyclo[3.2.1]octane-3-methylamine, respectively, by procedures described in Example 5.

EXAMPLE 7

Bicyclo[3.2.1]octane-1-methylamine

A solution of bicyclo[3.2.1]octane-1-carboxylic acid (5. g.) in $SOCl_2$ (25 ml.) is refluxed for 1 hour and then allowed to stand overnight at room temperature. The excess $SOCl_2$ is removed in vacuo, the residual oil is taken up in benzene (10 ml.), and the solution evaporated in vacuo to give the acid chloride as an oil.

The crude acid chloride is dissolved in dry tetrahydrofuran (15 ml.) and the solution added dropwise during 2–3 minutes to an ice-cold solution of concentrated NH$_4$OH (75 ml.). After stirring 1 hour, water (25 ml.) is added, and the precipitated 1-carboxamide collected by filtration.

To a slurry of LiAlH$_4$ (3 g.) in boiling tetrahydrofuran (400 ml.) is added portionwise over 1 hour 3 g. of the above amide, all under nitrogen. The mixture then is heated at reflux for 46 hours, cooled, and excess LiAlH$_4$ decomposed by dropwise addition of saturated aqueous Na$_2$SO$_4$. The resulting white slurry is filtered, the filter cake washed with ether, and the combined filtrates evaporated in vacuo. The liquid residue is boiled with ether and the ether layer dried. Evaporation of the ether gives the title 1-aminomethyl product. Treatment of an ether solution of the product with ethereal HCl gives a hydrochloride salt which is purified by recrystallization.

Bicyclo[3.2.1]octane - 2 - methylamine, bicyclo[3.2.1]octane-3-methylamine, bicyclo[3.2.1]octane - 6 - methylamine, and bicyclo[3.2.1]octane-8-methylamine are all prepared in the same manner from the corresponding carboxylic acids.

I claim:

1. A method of preventing influenza infection comprising administering to a warm-blooded mammal an effective, but nontoxic, amount of a compound of the formula

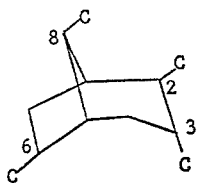

where one C group is NH$_2$, CH$_2$NH$_2$, or

and the other C groups are hydrogen, or a pharmaceutically acceptable acid addition salt thereof.

2. A method as claimed in claim 1, where one C group is NH$_2$, and the other C groups are hydrogen.

3. A method as claimed in claim 2, where the C group at the 2-position is NH$_2$, and the other C groups are hydrogen.

4. A method as claimed in claim 1, where the C group at the 2-position is CH$_2$NH$_2$, and the other C groups are hydrogen.

5. An oral dosage unit in the form of a tablet or capsule for the prevention of influenza infections in warm-blooded mammals comprising 50–500 mg. of a compound as defined in claim 1 and a pharmaceutical carrier.

6. An oral dosage unit in the form of a tablet or capsule for the prevention of influenza infections in warm-blooded mammals comprising 50–500 mg. of a compound as defined in claim 2 and a pharmaceutical carrier.

7. An oral dosage unit in the form of a tablet or capsule for the prevention of influenza infections in warm-blooded mammals comprising 50–500 mg. of a compound as defined in claim 3 and a pharmaceutical carrier.

8. An oral dosage unit in the form of a tablet or capsule for the prevention of influenza infections in warm-blooded mammals comprising 50–500 mg. of a compound as defined in claim 4 and a pharmaceutical carrier.

References Cited

FOREIGN PATENTS 1,167,337  4/1964  Germany.

ALBERT T. MEYERS, *Primary Examiner.*

J. GOLDBERG, *Assistant Examiner.*